(12) United States Patent
Hong (10) Patent No.: US 12,446,000 B2
(45) Date of Patent: Oct. 14, 2025

(54) PAGING RESPONSE METHOD AND APPARATUS, PAGING METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 285 days.

(21) Appl. No.: 18/039,134

(22) PCT Filed: Nov. 30, 2020

(86) PCT No.: PCT/CN2020/132807
§ 371 (c)(1),
(2) Date: May 26, 2023

(87) PCT Pub. No.: WO2022/110154
PCT Pub. Date: Jun. 2, 2022

(65) Prior Publication Data
US 2024/0015696 A1 Jan. 11, 2024

(51) Int. Cl.
*H04W 68/02* (2009.01)
(52) U.S. Cl.
CPC .................. *H04W 68/02* (2013.01)
(58) Field of Classification Search
CPC ...................................... H04W 68/02
USPC ........................................... 455/458
See application file for complete search history.

(56) References Cited

U.S. PATENT DOCUMENTS

| | | | |
|---|---|---|---|
| 2006/0270422 A1* | 11/2006 | Benco | H04W 68/04 455/458 |
| 2008/0025250 A1* | 1/2008 | Wang | H04W 68/02 370/328 |
| 2011/0286465 A1* | 11/2011 | Koodli | H04W 68/00 370/401 |
| 2013/0203461 A1* | 8/2013 | Li | H04W 8/183 455/552.1 |
| 2016/0112084 A1 | 4/2016 | Parron et al. | |

(Continued)

FOREIGN PATENT DOCUMENTS

| | | |
|---|---|---|
| CN | 102026374 A | 4/2011 |
| CN | 104754643 A | 7/2015 |

(Continued)

OTHER PUBLICATIONS

ISA State Intellectual Property Office of the People's Republic of China, International Search Report Issued in Application No. PCT/CN2020/132807, Aug. 26, 2021, WIPO, 4 pages.

(Continued)

*Primary Examiner* — Mark G. Pannell
(74) *Attorney, Agent, or Firm* — Volpe Koenig (57) ABSTRACT

A paging response method includes that: a target SIM determines, in response to receiving a target physical downlink control channel (PDCCH) for paging the target SIM, whether the target PDCCH includes target indication information, where the target indication information indicates that a target service priority corresponding to a paging service that pages the target SIM meets a preset service priority condition; and the target SIM performs a paging response in response to determining that the target PDCCH includes the target indication information.

20 Claims, 7 Drawing Sheets

A target SIM determines, in response to receiving a target PDCCH for paging the target SIM, whether the target PDCCH includes target indication information — 101

The target SIM performs a paging response in response to determining that the target PDCCH includes the target indication information — 102

(56) References Cited

U.S. PATENT DOCUMENTS

| | | | |
|---|---|---|---|
| 2021/0014822 A1* | 1/2021 | Gurumoorthy | H04W 68/02 |
| 2021/0029205 A1* | 1/2021 | Dandra | H04W 4/60 |
| 2022/0174645 A1* | 6/2022 | Xie | H04W 68/02 |
| 2022/0295445 A1* | 9/2022 | Göktepe | H04W 68/02 |

FOREIGN PATENT DOCUMENTS

| | | |
|---|---|---|
| CN | 105530024 A | 4/2016 |
| CN | 105979501 A | 9/2016 |
| CN | 108924887 A | 11/2018 |
| CN | 109315017 A | 2/2019 |
| CN | 110581809 A | 12/2019 |
| CN | 111278106 A | 6/2020 |
| EP | 3481116 A1 | 5/2019 |
| EP | 3735049 A1 | 11/2020 |

OTHER PUBLICATIONS

PCTEST Engineering Laboratory, "Update Symbols and Abbreviations in TR 37.901", R5-142099, 3GPP TSG-RAN WG5 Meeting #63, Seoul, Korea, May 19-23, 2014, 4 pages.

Vodafone, "TP Updates for TR 37.901 concerning Definitions, Symbols and Abbreviations", R5-113577, 3GPP TSG RAN WG5 Meeting #52, Athens, Greece, Aug. 22-26, 2011, 5 pages.

Vice Chairman, "Report of E-UTRA control plane session", Tdoc R2-082841, 3GPP TSG-RAN WG2 Meeting #62, Kansas City, USA, May 5-9, 2007, 22 pages.

* cited by examiner

PAGING RESPONSE METHOD AND APPARATUS, PAGING METHOD AND APPARATUS, AND STORAGE MEDIUM

CROSS-REFERENCE TO RELATED APPLICATION

This application is the U.S. national phase application of International Application No. PCT/CN2020/132807, filed on Nov. 30, 2020, the disclosure of which is incorporated herein by reference in its entirety for all purposes.

TECHNICAL FIELD

The present disclosure relates to the field of communications, and in particular, to paging response methods and apparatuses, paging methods and apparatuses, and storage media.

BACKGROUND

More and more multi-subscriber identity module (SIM) terminals appear as wireless communication technologies develop. Currently, the multi-SIM terminals generally work in corresponding modes implemented by various terminal manufactures, which introduces many different terminal operations and working modes, such as a dual-SIM single-standby type, a dual-SIM dual-standby and single-active type, and a dual-SIM dual-standby and dual-active type. However, it may further introduce some problems. For example, different SIMS may collide in paging time, so that one or more paging signalings are either unable to be received or missed by the multi-SIM terminal, thereby failing to establish corresponding services.

SUMMARY

In view of the problems in the related art, the present disclosure provides a paging response method and apparatus, a paging method and apparatus, and storage media. According to a first aspect of the present disclosure, a paging response method is provided. The method is applicable to a multi-SIM terminal, and includes: in response to receiving a target physical downlink control channel (PDCCH) for paging a target SIM, determining, by the target SIM, whether the target PDCCH includes target indication information, where the target indication information indicates that a target service priority corresponding to a paging service that pages the target SIM meets a preset service priority condition; and performing, by the target SIM, a paging response in response to determining that the target PDCCH includes the target indication information.

According to a second aspect of the present disclosure, a paging method is provided. The method is applicable to a network-side device, and includes: determining, in response to determining that a target SIM in a multi-SIM terminal is expected to be paged, a target service priority corresponding to a paging service that pages the target SIM; and transmitting, in response to determining that the target service priority meets a preset service priority condition, a target PDCCH including target indication information to the target SIM, where the target indication information indicates that the target service priority meets the preset service priority condition.

According to a third aspect of the present disclosure, a paging response apparatus is provided and includes: one or more processors; and one or more memories for storing instructions executable by the one or more processors; where the one or more processors are configured to perform any one of the paging response methods according to the foregoing first aspect.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of the description, illustrate examples consistent with the present disclosure and, together with the description, serve to explain the principles of the disclosure.

DETAILED DESCRIPTION OF THE EMBODIMENTS

Embodiments will be described in detail here with the examples thereof illustrated in the drawings. When the following descriptions involve the drawings, like numerals in different drawings refer to like or similar elements unless otherwise indicated. The implementations described in the following examples do not represent all implementations consistent with the present disclosure. Rather, they are examples of apparatuses and methods consistent with some aspects of the present disclosure as detailed in the appended claims.

The terms used in the present disclosure are for the purpose of describing particular examples only, and are not intended to limit the present disclosure. Terms determined by "a", "said" and "the" in their singular forms in the present disclosure and the appended claims are also intended to include their plural forms, unless clearly indicated otherwise in the context. It should also be understood that the term "and/or" as used herein is and includes any and all possible combinations of one or more of the associated listed items.

It should be understood that although the terms such as first, second, and third may be used in the present disclosure to describe various information, such information should not be limited by these terms. These terms are only used to distinguish information of the same category with each other. For example, without departing from the scope of the present disclosure, first information may also be referred as second information, and similarly, second information may also be referred as first information. Depending on the context, the word "if" as used herein may be interpreted as "when", "upon", or "in response to determining".

The following introduces paging response methods provided by the present disclosure from a multi-SIM terminal side first.

Some examples of the present disclosure provide a paging response method. By referring to FIG. 1, which illustrates a flowchart of a paging response method according to an example, the paging response method may be applied to a multi-subscriber identity module (SIM) terminal. The multi-SIM terminal includes at least two SIMS. The method may include the following steps 101 and 102.

Figure 1:
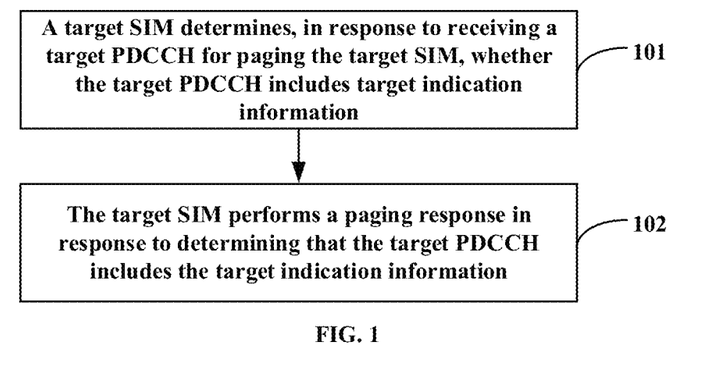
FIG. 1 illustrates a schematic flowchart of a paging response method according to an example.

At step 101, a target SIM determines, in response to receiving a target physical downlink control channel (PDCCH) for paging the target SIM, whether the target PDCCH includes target indication information.

In the example of the present disclosure, the target SIM is a SIM in a disconnected state in the multi-SIM terminal. The disconnected state includes but not limited to an idle state or an inactive state. The target SIM may monitor at any paging occasion whether a PDCCH scrambled by a paging-radio network temporary identifier (P-RNTI) is present, and determine that the target PDCCH is received once the presence of the PDCCH scrambled by the P-RNTI is monitored.

In the example of the present disclosure, the target SIM may further determine whether the target PDCCH includes the target indication information. In particular, the target indication information indicates that a target service priority corresponding to a paging service that pages the target SIM meets a preset service priority condition. The preset service priority condition includes but not limited to that a highest service priority is reached.

At step 102, the target SIM performs a paging response in response to determining that the target PDCCH includes the target indication information.

In the example of the present disclosure, if it is determined that the target PDCCH includes the target indication information, the target SIM may determine that the target service priority corresponding to the paging service meets the preset service priority condition, i.e., the target service priority reaches the highest service priority. In this case, the target SIM may perform the paging response for the target PDCCH.

In the above example, in the case where a paging conflict occurs on the multi-SIM terminal, it achieves a purpose of determining whether to perform the paging response based on the target service priority of the paging service, i.e., a paging cause, thereby achieving a high availability.

In one example, in step 101, the target SIM determines whether the target PDCCH includes the target indication information, which may include that: the target SIM determines whether the target PDCCH includes the target indication information based on a short message in response to determining that the target PDCCH includes the short message.

In the example of the present disclosure, the target SIM may first determine whether the target PDCCH includes the short message. Further, in the case where the target PDCCH includes the short message, it is determined based on the short message whether the target PDCCH includes the target indication information.

In one example, the target SIM may determine whether the target PDCCH includes the short message based on a bit value corresponding to a short message indicator in the target PDCCH.

In particular, the content indicated by the different bit values corresponding to the short message indicator is shown in Table 1.

TABLE 1

| Bit value corresponding to short message indicator | Content indicated by short message indicator |
| --- | --- |
| 00 | Reserved |
| 01 | Only scheduling information for Paging is present in the downlink control information (DCI) |
| 10 | Only short message is present in the DCI |
| 11 | Both scheduling information for Paging and short message are present in the DCI |

As shown according to Table 1, when determining that the bit value corresponding to the short message indicator in the target PDCCH is equal to a first preset bit value that is 10 or 11, the target SIM may determine that the target PDCCH includes the short message.

Further, the target SIM determines whether the target PDCCH includes the target indication information based on the short message, which may include that:

the target SIM determines, in response to determining that one or more bit values corresponding to at least one target bit of the short message are equal to a second preset bit value, the target SIM determines that the target service priority meets the preset service priority condition.

In particular, the short message includes 8 bits, and the contents indicated by each bit are shown in Table 2.

TABLE 2

| N-th bit | Content indicated by the short message |
| --- | --- |
| 1 | System information modification (systemInfoModification) If set to 1: indication of a broadcast control channel (BCCH) modification other than system information block (SIB) 6, SIB7 and SIB8 |
| 2 | Indication of earthquake and tsunami warning system and commercial mobile alert system (etwsAndCmasIndication) If set to 1: indication of an ETWS primary notification and/or an ETWS secondary notification and/or a CMAS notification |
| 3 | Stop paging monitoring (stopPagingMonitoring) If set to 1: indication of stopping monitoring PDCCH in the current paging occasion (PO) |
| 4-8 | Not used in the existed releases of the specification, and shall be ignored by the terminal if received. |

In the example of the present disclosure, the target SIM may determine whether the target PDCCH includes the target indication information when the one or more bit values corresponding to the at least one target bit of the short message are determined to be equal to the second preset bit value.

In particular, the second preset bit value includes but not limited to 1. The at least one target bit may include the bit for indicating the natural disaster warning in the short message, e.g., the second bit. Alternatively, the at least one target bit may include one or more bits for indicating at least one type of service with a predefined priority in the short message. In some examples, the service with the predefined priority may refer to a service with higher priority. In one example, the service with the predefined priority may include but not limited to an alarm. In this case, the target bit may be, but not limited to, at least one of the fourth to eighth bits of the short message.

In the example of the present disclosure, the scope of the service with the predefined priority may be different from that of the natural disaster warning, and the former may be smaller than the latter. The scope of the natural disaster warning may cover a plurality of regions or an entire country, while the scope of the service with the predefined priority may be relatively small, for example, may cover a certain area. In particular, the alert may include but not limited to some types of alert in a region, such as that a child is lost or a specific person appears in a certain area. The specific person may include but not limited to those who have been diagnosed with an epidemic, criminals who are harmful to society and the like.

In one example, when the 4th bit of the short message is set to the second preset bit value that includes but not limited to 1 and indicates the service with the predefined priority, Table 2 may be updated to Table 3 adaptively.

TABLE 3

| N-th bit | Content indicated by the short message |
|---|---|
| 1 | System information modification (systemInfoModification) If set to 1: indication of a broadcast control channel (BCCH) modification other than SIB6, SIB7 and SIB8 |
| 2 | Indication of earthquake and tsunami warning system and commercial mobile alert system (etwsAndCmasIndication) If set to 1: indication of an ETWS primary notification and/or an ETWS secondary notification and/or a CMAS notification |
| 3 | Stop paging monitoring (stopPagingMonitoring) If set to 1: indication of stopping monitoring PDCCH in the current PO |
| 4 | Service with the predefined priority |
| 5-8 | Not used in the existed releases of the specification, and shall be ignored by the terminal if received. |

In practical applications, the other bits, including but not limited to at least one of the fifth to eighth bits, may also be set as the second preset value, so as to indicate different types of service with the predefined priority, which is not limited by the present disclosure.

In the above example, the target SIM may determine whether the one or more bit values corresponding to the at least one target bit of the short message are equal to the second preset bit value, so as to determine whether the target indication information is included in the target PDCCH. In particular, the at least one target bit includes at least one of the following items: the bit for indicating the natural disaster warning in the short message, or the one or more bits for indicating at least one type of service with the predefined priority in the short message. In the present disclosure, in the case where a paging cause is determined to be the presence of the natural disaster or the alert based on the short message, the target SIM determines whether the target PDCCH includes the target indication information. Therefore, in the case where the paging conflict occurs on the multi-SIM terminal, it achieves a purpose of determining whether to perform the paging response based on the paging cause.

In one example, in step 102, the target SIM performs the paging response, which may include that: the target SIM receives target system messages corresponding to the paging service through at least a part of receiving antennas of the multi-SIM terminal.

In the example of the present disclosure, the multi-SIM terminal may be provided with one or more receiving (Rx) antennas. After determining that the target PDCCH includes the target indication information, the target SIM may receive the target system messages corresponding to the paging service through at least the part of the receiving antennas.

In some examples, the target SIM may select at least the part of the receiving antennas of the multi-SIM terminal to receive the target system messages according to the number of the receiving antennas of the multi-SIM terminal in combination with a measured cell signal quality.

As an example, when the number of the receiving antennas of the multi-SIM terminal is 1, the target SIM directly receives the target system messages through the receiving antenna. As another example, when there are a plurality of receiving antennas of the multi-SIM terminal, the target SIM may receive the target system messages through a part of the receiving antennas if it takes the number of the receiving antennas in combination with the cell signal quality into consideration and determines that the part of receiving antennas, which are selected from the plurality of receiving antennas, are enough for receiving the target system messages. As another example, when there are a plurality of receiving antennas of the multi-SIM terminal, the target SIM may receive the target system messages through all of the receiving antennas configured in the multi-SIM terminal if it takes the number of the receiving antennas in combination with the cell signal quality into consideration and determines that all of the receiving antennas are necessary for receiving the target system messages.

Figure 2:
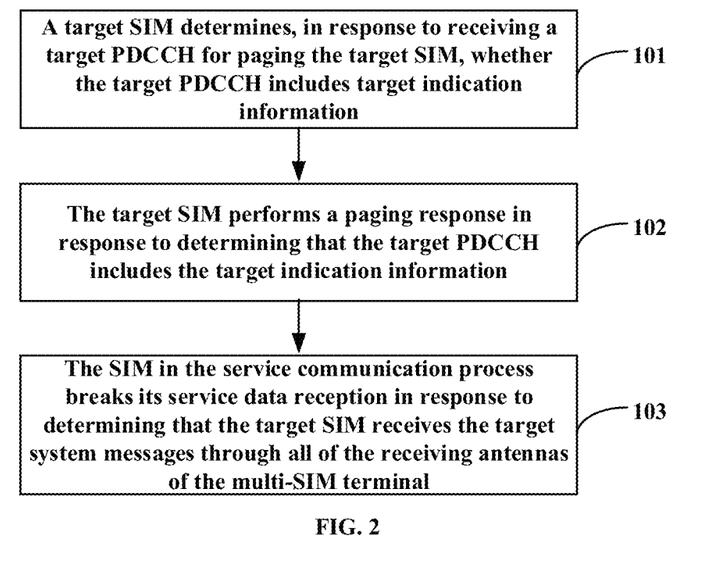
FIG. 2 illustrates a schematic flowchart of another paging response method according to an example.

In one example, by referring to FIG. 2 which illustrates a flowchart of another paging response method according to the example illustrated in FIG. 1, the above method may further include the following step 103.

At step 103, a SIM in a service communication process breaks its service data reception in response to determining that the target SIM receives the target system messages through all of the receiving antennas of the multi-SIM terminal.

In the example of the present disclosure, when the target SIM asks all of the receiving antennas for receiving the target system messages, the SIM in the service communication process has to break its service data reception, that is, the SIM is unable to continue receiving the service data.

Figure 3:
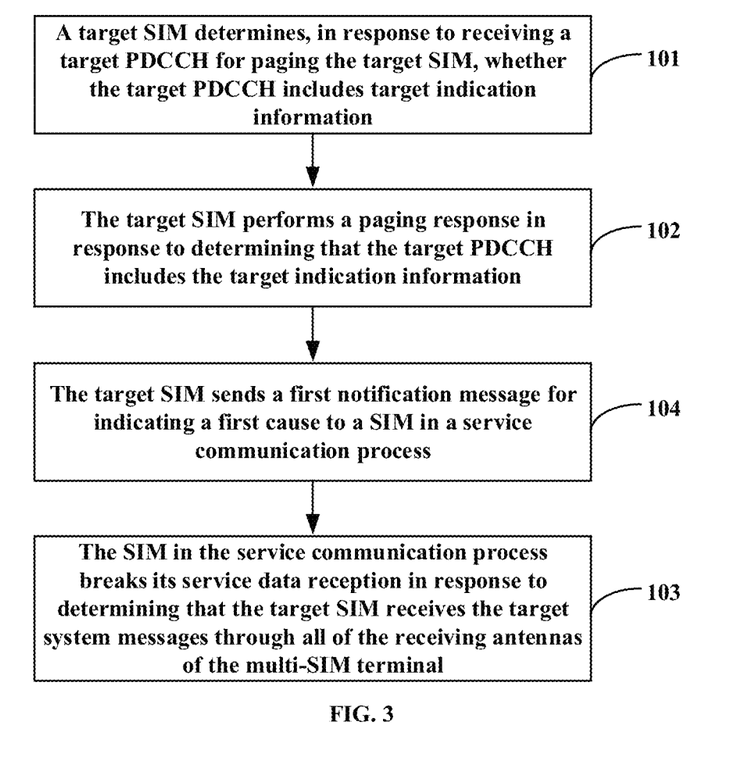
FIG. 3 illustrates a schematic flowchart of another paging response method according to an example.

Further, by referring to FIG. 3 which illustrates a flowchart of another paging response method according to the example illustrated in FIG. 2, the above method may further include the following step 104.

At step 104, the target SIM sends a first notification message for indicating a first cause to the SIM in the service communication process.

In particular, the first cause refers to that the SIM in the service communication process breaks its service data reception because the target SIM is expected to receive the target system messages. That is, the target SIM may inform the SIM in the service communication process the first cause why the SIM in the service communication process breaks its service data reception is that the target SIM is expected to receive the target system messages associated with the ETWS, the CMAS, the service with the predefined priority, or the like. The SIM in the service communication process breaks its service data reception according to the received first notification message.

In the above example, the target SIM may receive the target system messages corresponding to the paging service through all of the receiving antennas of the multi-SIM terminal, and accordingly, the SIM in the service communication process has to break its service data reception, which achieves the purpose that the target SIM performs the paging response in the case where the paging conflict occurs on the multi-SIM terminal.

Figure 4:
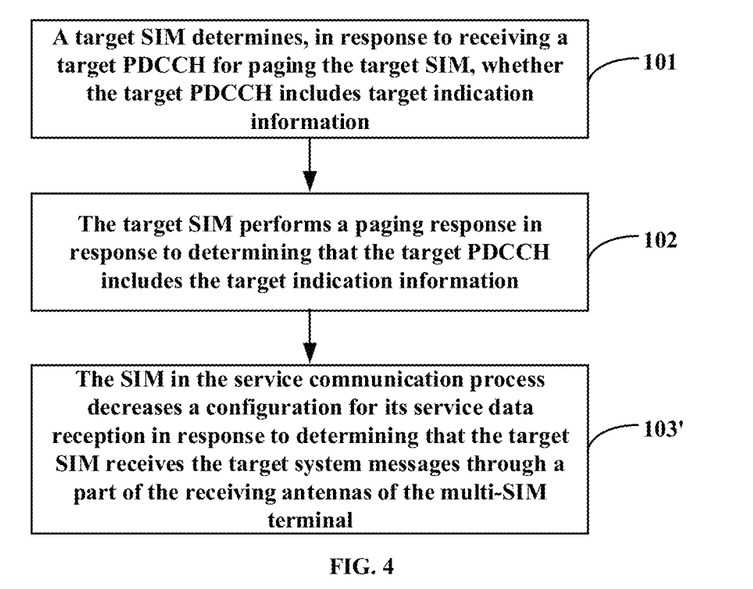
FIG. 4 illustrates a schematic flowchart of another paging response method according to an example.

In one example, by referring to FIG. 4 which illustrates a flowchart of another paging response method according to the example illustrated in FIG. 1, the above method may further include the following step 103'.

At step 103', a SIM in a service communication process decreases a configuration for its service data reception in response to determining that the target SIM receives the target system messages through a part of the receiving antennas of the multi-SIM terminal.

In the example of the present disclosure, the SIM in the service communication process may decrease the configuration for its service data reception if the target SIM receives the target system messages through the part of the receiving antennas of the multi-SIM terminal. In some examples, the SIM in the service communication process may receive its service data through at least one receiving antenna rather than one or more receiving antennas used by the target SIM.

Figure 5:
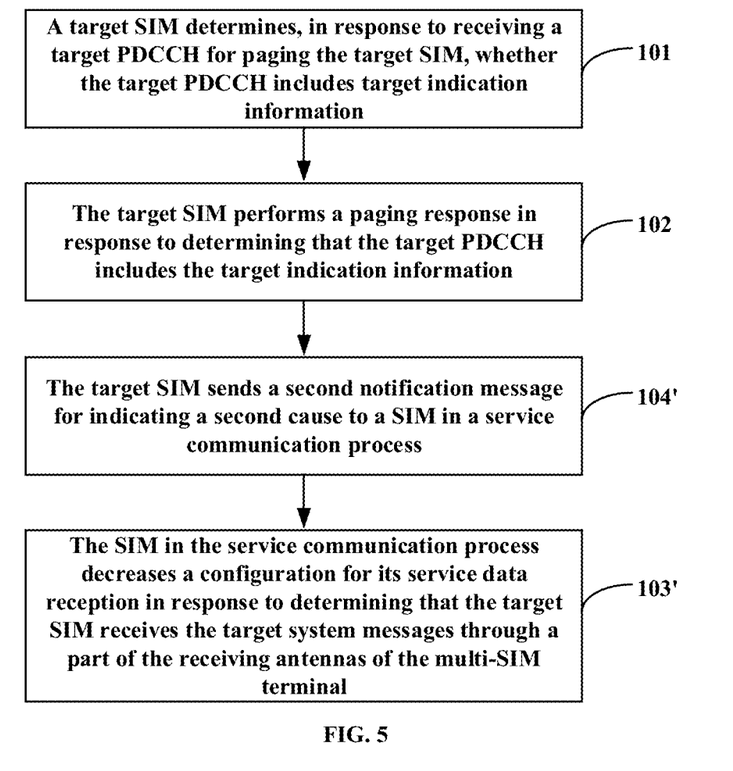
FIG. 5 illustrates a schematic flowchart of another paging response method according to an example.

By referring to FIG. 5 which illustrates a flowchart of another paging response method according to the example illustrated in FIG. 4, the above method may further include the following step 104'.

At step 104', the target SIM sends a second notification message for indicating a second cause to the SIM in the service communication process.

In particular, the second cause refers to that the SIM in the service communication process decreases the configuration for its service data reception because the target SIM is expected to receive the target system messages associated with the ETWS, the CMAS, the service with the predefined priority, or the like. The SIM in the service communication process decreases the configuration for its service data reception according to the received second notification message.

In the above example, the target SIM may receive the target system messages corresponding to the paging service through the part of the receiving antennas of the multi-SIM terminal, and accordingly, the SIM in the service communication process has to decrease the configuration for its service data reception, which also achieves the purpose that the target SIM performs the paging response in the case where the paging conflict occurs on the multi-SIM terminal.

The following introduces paging methods provided by the present disclosure from a network-side device side.

Some examples of the present disclosure provide a paging method. By referring to FIG. 6 which illustrates a flowchart of a paging method according to an example, the paging method may be applied to the network-side device that includes but not limited to a base station or a core network device. The method may include the following steps 201 and 202.

Figure 6:
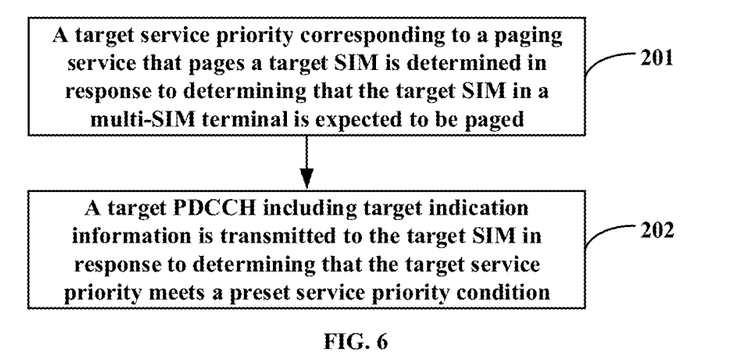
FIG. 6 illustrates a schematic flowchart of a paging method according to an example.

At step 201, a target service priority corresponding to a paging service that pages a target SIM is determined in response to determining that the target SIM in a multi-SIM terminal is expected to be paged.

At step 202, a target PDCCH including target indication information is transmitted to the target SIM in response to determining that the target service priority meets a preset service priority condition.

In particular, the target indication information indicates that the target service priority meets the preset service priority condition. The preset service priority condition may include but not limited to that a highest service priority is reached.

In the above example, the network-side device may transmit the target PDCCH including the target indication information to the target SIM in the multi-SIM terminal, so that the target SIM can determine that the target service priority corresponding to the paging service meets the preset service priority condition and be expected to perform a paging response immediately. In the case where a paging conflict occurs on the multi-SIM terminal, it achieves a purpose of determining whether to perform the paging response based on the target service priority of the paging service, i.e., a paging cause, thereby achieving a high availability.

In one example, a bit value corresponding to a short message indicator in the target PDCCH is equal to a first preset bit value. The first preset bit value, which indicates that the target PDCCH includes a short message, includes but not limited to 10 or 11.

Further, one or more bit values corresponding to at least one target bit of the short message in the target PDCCH are equal to a second preset bit value. The second preset bit value may be 1 (or 0, which is not limited by the present disclosure) to indicate that the target service priority meets the preset service priority condition. The at least one target bit includes at least one of the following items: a bit for indicating a natural disaster warning in the short message, or one or more bits for indicating at least one type of service with a predefined priority in the short message. In some examples, the at least one type of service with the predefined priority includes but not limited to an alert. The target bit may be the second bit, the fourth bit, or at least one of the fifth to eighth bits in Table 3, which is not limited by the present disclosure.

In the above example, by configuring the bit value corresponding to the short message indicator in the target PDCCH, and further by configuring the one or more bit values corresponding to the at least one target bit of the short message, the network-side device may obtain the target PDCCH including the target indication information, so that the target SIM can perform the paging response in time in the case where a paging conflict occurs on the multi-SIM terminal. Thereby achieving a high availability.

Figure 7:
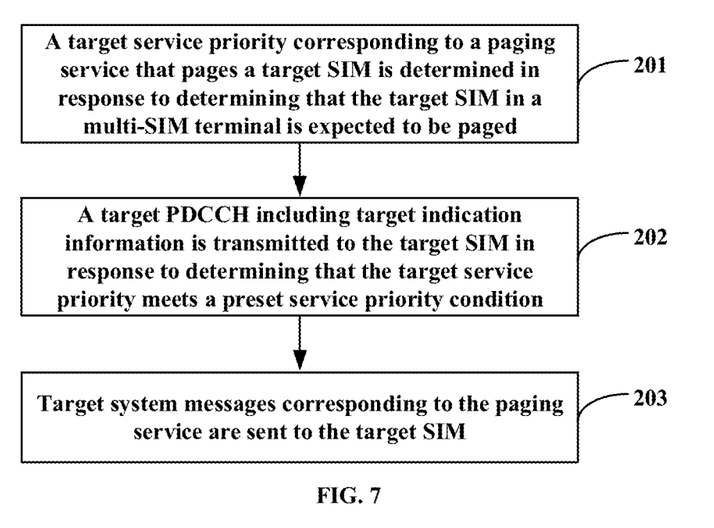
FIG. 7 illustrates a schematic flowchart of another paging method according to an example.

In one example, by referring to FIG. 7 which illustrates a flowchart of another paging method according to the example illustrated in FIG. 6, the above method may further include the following step 203.

At step 203, target system messages corresponding to the paging service are sent to the target SIM.

In the example of the present disclosure, the network-side device may further send the target system messages to the target SIM.

In the above example, after transmitting the target PDCCH including the target indication information to the target SIM, the network-side device may also send the target system messages to the target SIM. The target SIM performs the paging response, and then receives the target system messages, which achieves a purpose that the target SIM performs the paging response in the case where a paging conflict occurs on the multi-SIM terminal.

Figure 8:
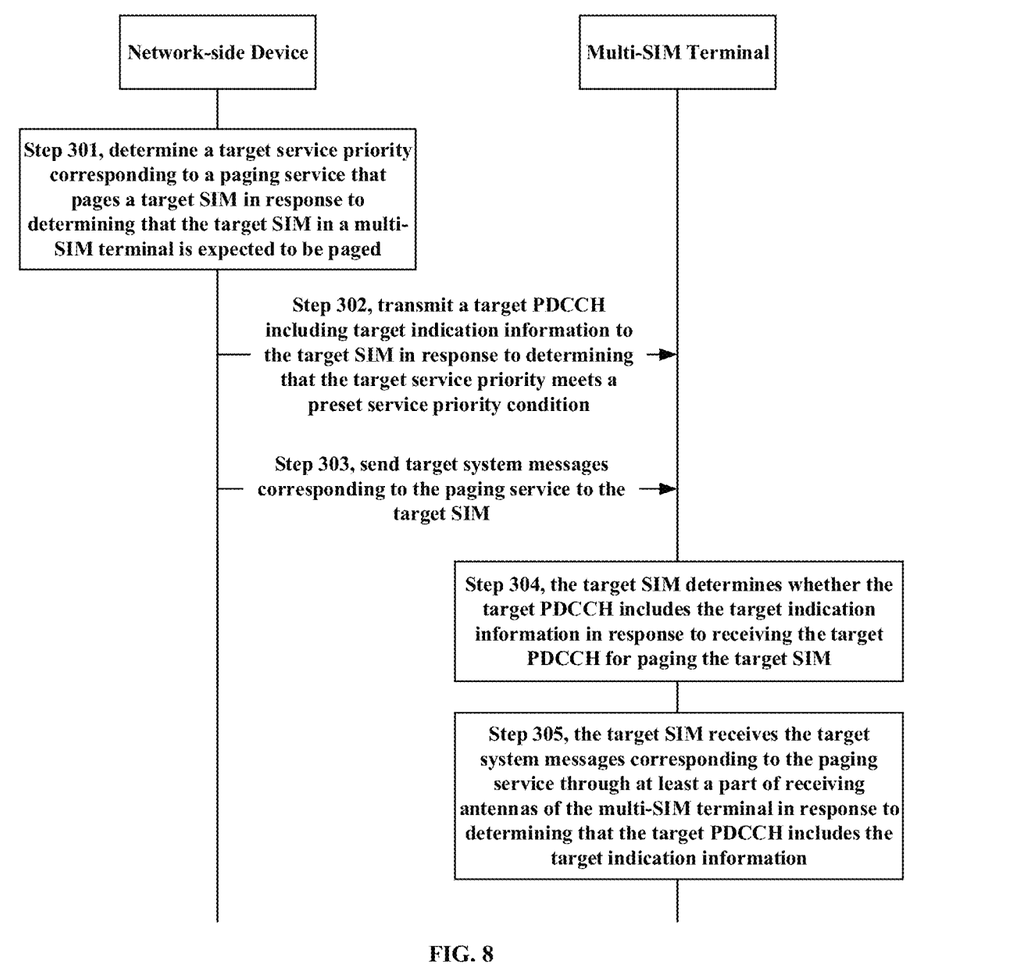
FIG. 8 illustrates a schematic flowchart of a paging and paging response method according to an example.

In one example, by referring to FIG. 8 which illustrates a flowchart of a paging and paging response method according to an example, the method may include the following steps 301-305.

At step 301, a network-side device determines a target service priority corresponding to a paging service that pages a target SIM in a multi-SIM terminal in response to determining that the target SIM is expected to be paged.

At step 302, the network-side device transmits a target PDCCH including target indication information to the target SIM in response to determining that the target service priority meets a preset service priority condition. In particular, the target indication information indicates that the target service priority corresponding to the paging service that pages the target SIM meets the preset service priority condition.

At step 303, the network-side device sends target system messages corresponding to the paging service to the target SIM.

At step 304, the multi-SIM terminal determines whether the target PDCCH includes the target indication information in response to receiving the target PDCCH for paging the target SIM.

At step 305, the multi-SIM terminal receives the target system messages corresponding to the paging service through at least a part of receiving antennas of the multi-SIM terminal in response to determining that the target PDCCH includes the target indication information.

In the example of the present disclosure, once receiving the target system messages through all of the receiving antennas, the target SIM in the multi-SIM terminal may send a first notification message for indicating a first cause to a SIM in a service communication process. And the SIM in the service communication process may determine based on the first notification message that the target SIM is expected to receive the target system messages, and thereby break its service data reception.

Once receiving the target system messages through a part of the receiving antennas, the target SIM may send a second notification message for indicating a second cause to the SIM in the service communication process. And the SIM in the service communication process may determine based on the second notification message that the target SIM is expected to receive the target system messages, and thereby decrease a configuration for its service data reception.

In the above example, in the case where a paging conflict occurs on the multi-SIM terminal, it achieves a purpose of determining whether to perform the paging response based on the target service priority of the paging service, i.e., the paging cause, thereby achieving a high availability.

Corresponding to the foregoing method examples implementing the application functions, the present disclosure further provides apparatus examples implementing the application functions.

Figure 9:
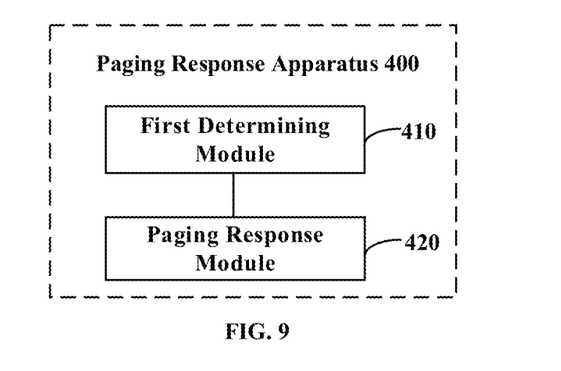
FIG. 9 illustrates a block diagram of a paging response apparatus according to an example.

By referring to FIG. 9, which illustrates a block diagram of a paging response apparatus 400 according to an example. The apparatus 400 is applicable to a multi-SIM terminal and includes a first determining module 410 and a paging responding module 420.

The first determining module 410 is configured to in response to receiving a target PDCCH for paging a target SIM, determine, by the target SIM, whether the target PDCCH includes target indication information, where the target indication information indicates that a target service priority corresponding to a paging service that pages the target SIM meets a preset service priority condition.

The paging responding module 420 is configured to perform, by the target SIM, a paging response in response to determining that the target PDCCH includes the target indication information.

Figure 10:
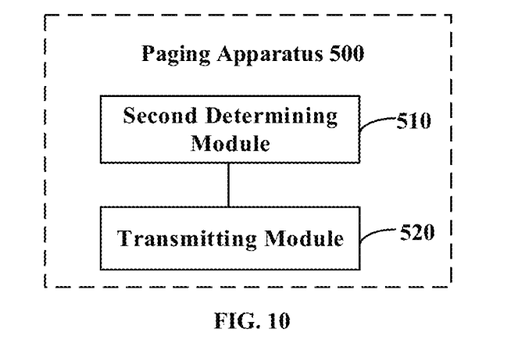
FIG. 10 illustrates a block diagram of a paging apparatus according to an example.

By referring to FIG. 10, which illustrates a block diagram of a paging apparatus 500 according to an example. The apparatus 500 is applicable to a network-side device, and includes a second determining module 510 and a transmitting module 520.

The second determining module 510 is configured to determine, in response to determining that a target SIM in a multi-SIM terminal is expected to be paged, a target service priority corresponding to a paging service that pages the target SIM.

The transmitting module 520 is configured to transmit, in response to determining that the target service priority meets a preset service priority condition, a target PDCCH including target indication information to the target SIM, where the target indication information indicates that the target service priority meets the preset service priority condition.

Since the apparatus examples essentially correspond to the method examples, reference may be made to the description of related parts of the method examples. The apparatus examples described above are illustrative, in which the units described as separate components may or may not be physically separated, and the components displayed as the units may or may not be physical units, that is, may be located in one place or distributed to a plurality of units in a network. Some or all of the modules may be selected according to actual needs to achieve the purpose of the implementations of the present disclosure. It can be understood and implemented by those of ordinary skill in the art without any creative effort.

Accordingly, the present disclosure also provides a computer-readable storage medium storing a computer program, and the computer program is configured to execute any one of the above-described paging response methods applicable to the multi-SIM terminal side.

Accordingly, the present disclosure also provides a computer-readable storage medium storing a computer program, and the computer program is configured to execute any one of the above-described paging methods applicable to the network-side device side.

Accordingly, the present disclosure also provides a paging response apparatus, including: one or more processors; and one or more memories for storing instructions executable by the one or more processors.

The one or more processors are configured to perform any one of the above paging response methods at the multi-SIM terminal side.

Figure 11:
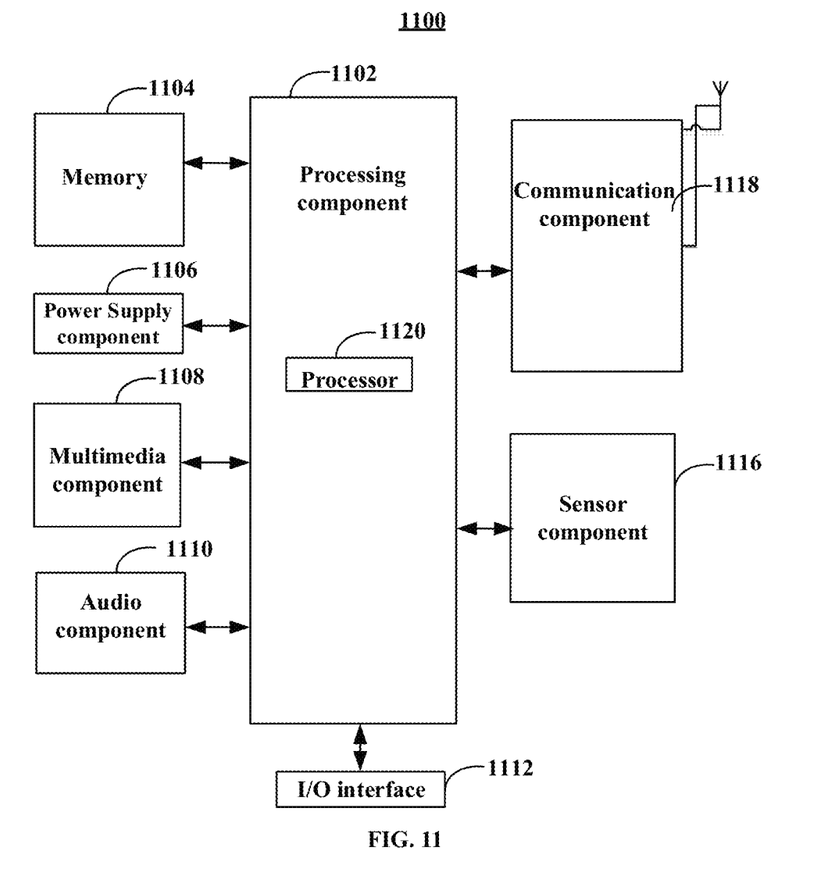
FIG. 11 illustrates a schematic structure diagram of a paging response apparatus according to an example of the present disclosure.

FIG. 11 illustrates a block diagram of an electronic device 1100 according to an example. For example, the electronic device 1100 may be a multi-SIM terminal including a plurality of SIMS, such as a mobile phone, a tablet, an e-book reader, a multimedia player, a wearable device, an in-vehicle terminal, an ipad, a smart TV.

By referring to FIG. 11, the electronic device 1100 may include one or more of the following components: a processing component 1102, a memory 1104, a power supply component 1106, a multimedia component 1108, an audio component 1110, an input/output (I/O) interface 1112, a sensor component 1116, and a communication component 1118.

The processing component 1102 generally controls the overall operations of the electronic device 1100, such as operations associated with display, phone calls, data paging responses, camera operations, and recording operations. The processing component 1102 may include one or more processors 1120 to perform instructions to complete all or a part of the steps of the above paging response methods. In addition, the processing component 1102 may include one or more modules, not shown, which facilitate the interaction between the processing component 1102 and other components. As an example, the processing component 1102 may include a multimedia module to facilitate the interaction between the multimedia component 1108 and the processing component 1102. As another example, the processing component 1102 may read executable instructions from the memory to implement the steps of the paging response method provided by each of the above examples.

The memory 1104 is configured to store various types of data to support the operations of the electronic device 1100. Examples of such data include instructions for any application program or method operated on the electronic device 1100, contact data, phonebook data, messages, pictures, videos, and the like. The memory 1104 may be implemented by any type of volatile or non-volatile storage device or a combination thereof, such as a static random access memory (SRAM), an electrically erasable programmable read-only memory (EEPROM), an erasable and programmable read-only memory (EPROM), a programmable read-only memory (PROM), a read-only memory (ROM), a magnetic memory, a flash memory, a magnetic disk or an optical disk.

The power supply component 1106 provides power for various components of the electronic device 1100. The power supply component 1106 may include a power management system, one or more power supplies, and other components associated with generating, managing, and distributing power for the electronic device 1100.

The multimedia component 1108 includes a screen providing an output interface between the electronic device 1100 and a user. In some examples, the multimedia component 1108 includes a front camera and/or a rear camera. The front camera and/or rear camera may receive external multimedia data when the electronic device 1100 is in an operating mode, such as a photographing mode or a video mode. Each front camera and rear camera may be a fixed optical lens system or have focal length and optical zooming capability.

The audio component 1110 is configured to output and/or input an audio signal. For example, the audio component 1110 includes a microphone (MIC) that is configured to receive an external audio signal when the electronic device 1100 is in an operating mode, such as a call mode, a recording mode, and a voice recognition mode. The received audio signal may be further stored in the memory 1104 or transmitted via the communication component 1118. In some examples, the audio component 1110 also includes a speaker for outputting an audio signal.

The I/O interface 1112 provides an interface between the processing component 1102 and a peripheral interface module. The above peripheral interface module may be a keyboard, a click wheel, buttons, or the like. These buttons may include but not be limited to a home button, a volume button, a start button and a lock button.

The sensor component 1116 includes one or more sensors to provide the electronic device 1100 with status assessments in various aspects. For example, the sensor component 1116 may detect an open/closed state of the electronic device 1100 and a relative positioning of components such as the display and keypad of the electronic device 1100. The sensor component 1116 may also detect a change in position of the electronic device 1100 or of a component of the electronic device 1100, the presence or absence of the user contact with the electronic device 1100, orientation or acceleration/deceleration of the electronic device 1100, and temperature change of the electronic device 1100. The sensor component 1116 may include a proximity sensor configured to detect the presence of a nearby object without any physical contact. The sensor component 1116 may further include an optical sensor, such as a complementary metal-oxide-semiconductor (CMOS) or charged coupled device (CCD) image sensor which is used in imaging applications.

In some examples, the sensor component 1116 may also include an acceleration sensor, a gyro sensor, a magnetic sensor, a pressure sensor, or a temperature sensor.

The communication component 1118 is configured to facilitate a wired or wireless paging response between the electronic device 1100 and another device. The electronic device 1100 may access a wireless network based on any paging response standard, such as WiFi, 2G or 3G, 4G, 5G, 6G or a combination thereof. In one example, the communication component 1118 receives broadcast signals or broadcast related information from an external broadcast management system via a broadcast channel. In one example, the communication component 1118 also includes a near-field paging response module to facilitate short-range paging response. For example, the near-field paging response module may be implemented based on a radio frequency identification (RFID) technology, an infrared data association (IrDA) technology, an ultra-wideband (UWB) technology, a Bluetooth® (BT) technology and other technologies.

In one or more examples, the electronic device 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above paging response methods.

In one or more examples, a non-transitory computer-readable storage medium including instructions, e.g., the memory 1104 including instructions, is provided. These instructions may be executed by the one or more processors 1120 of the electronic device 1100 to complete the above paging response methods. For example, the non-transitory computer-readable storage medium may be a read-only memory (ROM), a random access memory (RAM), a CD-ROM, a magnetic tape, a floppy disk, an optical data storage device, and the like.

Accordingly, the present disclosure also provides a paging apparatus, including: one or more processors; and one or more memories for storing instructions executable by the one or more processors.

The one or more processors are configured to perform any one of the above paging methods at the network-side device side.

Figure 12:
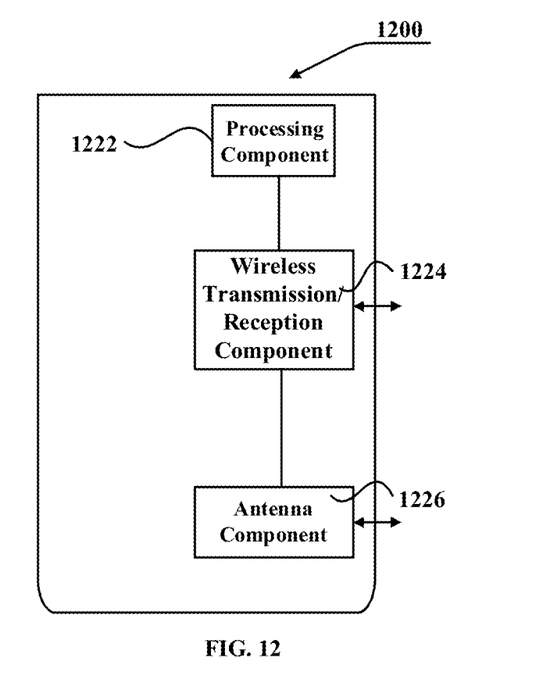
FIG. 12 illustrates a schematic structure diagram of a paging apparatus according to an example of the present disclosure.

FIG. 12 illustrates a schematic structure diagram of another paging apparatus 1200 according to an example. The apparatus 1200 may be provided as a network-side device. By referring to FIG. 12, the apparatus 1200 includes a processing component 1222, a wireless transmission/reception component 1224, an antenna component 1226, and a signal processing part peculiar to a wireless interface. The processing component 1222 may further include one or more processors.

One of the processors in the processing component 1222 may be configured to execute any one of the above paging methods at the network-side device side.

The technical solutions provided by the examples of the present disclosure may obtain the following beneficial effects.

In one or more examples of the present disclosure, in the case of receiving a target PDCCH for paging a target SIM, the target SIM may determine whether the target PDCCH includes target indication information, so as to determine whether to perform a paging response. In particular, the target indication information indicates that a target service priority corresponding to a paging service that pages the target SIM meets a preset service priority condition. According to the present disclosure, in the case where a paging conflict occurs on a multi-SIM terminal, it achieves a purpose of determining whether to perform the paging response based on the target service priority of the paging service, i.e., a paging cause, thereby achieving a high availability.

In one or more examples of the present disclosure, the target indication information may indicate that the target service priority corresponding to the paging service reaches a highest service priority, so that the target SIM in the multi-SIM terminal performs the paging response in time based on the target indication information. In the case where the paging conflict occurs on the multi-SIM terminal, it achieves a purpose of determining whether to perform the paging response based on the paging cause, thereby achieving a high availability.

In one or more examples of the present disclosure, the target SIM may determine whether the target PDCCH includes a short message, and determine whether the target PDCCH includes the target indication information based on the short message if the short message is included, which is easy to be implemented and achieves a high availability.

In one or more examples of the present disclosure, the target SIM may determine whether one or more bit values corresponding to at least one target bit of the short message are equal to a second preset bit value, so as to determine whether the target PDCCH includes the target indication information. In particular, the at least one target bit includes at least one of the following items: a bit for indicating a natural disaster warning in the short message, or one or more bits for indicating at least one type of service with a predefined priority in the short message. According to the present disclosure, when determining that the paging is caused by a natural disaster or an alarm based on the short message, the target SIM determines whether the target PDCCH includes the target indication information. Therefore, in the case where the paging conflict occurs on the multi-SIM terminal, it achieves a purpose of determining whether to perform the paging response based on the paging cause.

In one or more examples of the present disclosure, the target SIM may receive target system messages corresponding to the paging service through at least a part of receiving antennas of the multi-SIM terminal. In some examples, if the multi-SIM terminal receives the target system messages through all of the receiving antennas, a SIM in a service communication process needs to break its service data reception. If the multi-SIM terminal receives the target system messages through the part of the receiving antennas, the SIM in the service communication process needs to decrease a configuration for its service data reception. In the case where the paging conflict occurs on the multi-SIM terminal, it further achieves a purpose that the target SIM performs the paging response.

Other implementations of the present disclosure will be readily apparent to those skilled in the art after implementing the disclosure by referring to the description. The present disclosure is intended to cover any variations, uses, or adaptations of the present disclosure that are in accordance with the general principles thereof and include common general knowledge or conventional technical means in the art that are not disclosed in the present disclosure. The description and the examples are only illustrative, and the true scope and spirit of the present disclosure are set forth in the appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

The invention claimed is:

1. A paging response method, comprising:
  in response to receiving a target physical downlink control channel (PDCCH) for paging a target subscriber identity module (SIM), determining, by the target SIM in a multi-SIM terminal, whether the target PDCCH comprises target indication information, wherein the target indication information indicates that a target service priority corresponding to a paging service that pages the target SIM meets a preset service priority condition; and
  performing, by the target SIM in the multi-SIM terminal, a paging response in response to determining that the target PDCCH comprises the target indication information.

2. The method according to claim 1, wherein the preset service priority condition comprises that a highest service priority is reached.

3. The method according to claim 1, wherein determining, by the target SIM in the multi-SIM terminal, whether the target PDCCH comprises the target indication information comprises:
  determining, by the target SIM, whether the target PDCCH comprises the target indication information based on a short message in response to determining that the target PDCCH comprises the short message.

4. The method according to claim 3, wherein determining that the target PDCCH comprises the short message comprises:
  determining that the target PDCCH comprises the short message in response to determining that a bit value corresponding to a short message indicator in the target PDCCH is equal to a first preset bit value.

5. The method according to claim 3, wherein determining, by the target SIM in the multi-SIM terminal, whether the target PDCCH comprises the target indication information based on the short message comprises:
  determining, by the target SIM, that the target PDCCH comprises the target indication information in response to determining that one or more bit values corresponding to at least one target bit of the short message are equal to a second preset bit value.

6. The method according to claim 5, wherein the at least one target bit comprises at least one of:
  a bit for indicating a natural disaster warning in the short message, or one or more bits for indicating at least one type of service with a predefined priority in the short message.

7. The method according to claim 6, wherein the at least one type of service with the predefined priority comprises an alert.

8. The method according to claim 1, wherein performing, by the target SIM in the multi-SIM terminal, the paging response comprises:
  receiving, by the target SIM, target system messages corresponding to the paging service through at least a part of receiving antennas of the multi-SIM terminal.

9. The method according to claim 8, further comprising:
  breaking, by a SIM in a service communication process, its service data reception in response to determining that the target SIM receives the target system messages through all of the receiving antennas of the multi-SIM terminal.

10. The method according to claim 9, further comprising: sending, by the target SIM, a first notification message for indicating a first cause to the SIM in the service communication process, wherein the first cause refers to that the SIM in the service communication process breaks its service data reception because the target SIM is expected to receive the target system messages.

11. The method according to claim 8, further comprising: decreasing, by a SIM in a service communication process, a configuration for its service data reception in response to determining that the target SIM receives the target system messages through the part of the receiving antennas of the multi-SIM terminal.

12. The method according to claim 11, further comprising:
sending, by the target SIM, a second notification message for indicating a second cause to the SIM in the service communication process, wherein the second cause refers to that the SIM in the service communication process decreases the configuration for its service data reception because the target SIM is expected to receive the target system messages.

13. A paging method, comprising:
determining, by a network-side device and in response to determining that a target SIM in a multi-SIM terminal is expected to be paged, a target service priority corresponding to a paging service that pages the target SIM; and
transmitting, by the network-side device and in response to determining that the target service priority meets a preset service priority condition, a target physical downlink control channel (PDCCH) comprising target indication information to the target SIM, wherein the target indication information indicates that the target service priority meets the preset service priority condition.

14. The method according to claim 13, wherein the preset service priority condition comprises that a highest service priority is reached.

15. The method according to claim 13, wherein a bit value corresponding to a short message indicator in the target PDCCH is equal to a first preset bit value; and
one or more bit values corresponding to at least one target bit of the short message in the target PDCCH are equal to a second preset bit value.

16. The method according to claim 15, wherein the at least one target bit comprises at least one of:
a bit for indicating a natural disaster warning in the short message, or one or more bits for indicating at least one type of service with a predefined priority in the short message.

17. The method according to claim 16, wherein the at least one type of service with the predefined priority comprises an alert.

18. The method according to claim 13, further comprising:
sending target system messages corresponding to the paging service to the target SIM.

19. A paging apparatus, comprising:
one or more processors; and
one or more memories for storing instructions executable by the one or more processors;
wherein the one or more processors are configured to perform the paging method according to claim 13.

20. A paging response apparatus, comprising:
one or more processors; and
one or more memories for storing instructions executable by the one or more processors;
wherein the one or more processors are configured to:
in response to receiving a target physical downlink control channel (PDCCH) for paging a target SIM, determine whether the target PDCCH comprises target indication information, wherein the target indication information indicates that a target service priority corresponding to a paging service that pages the target SIM meets a preset service priority condition; and
perform a paging response in response to determining that the target PDCCH comprises the target indication information.

* * * * *